United States Patent

Hottinen

[11] Patent Number: 5,933,457
[45] Date of Patent: Aug. 3, 1999

[54] RECEIVING METHOD AND RECEIVER

[75] Inventor: Ari Hottinen, Vantaa, Finland

[73] Assignee: Nokia Telecommunications OY, Espoo, Finland

[21] Appl. No.: 08/727,417
[22] PCT Filed: Apr. 13, 1995
[86] PCT No.: PCT/FI95/00217
  § 371 Date: Dec. 18, 1996
  § 102(e) Date: Dec. 18, 1996
[87] PCT Pub. No.: WO95/28772
  PCT Pub. Date: Oct. 26, 1995

[30] Foreign Application Priority Data

Apr. 18, 1994 [FI] Finland ................................... 941788

[51] Int. Cl.⁶ ............................. H03K 9/00; H04L 27/06; H04L 27/14; H04L 27/22
[52] U.S. Cl. ............................................ 375/316; 375/349
[58] Field of Search .................................. 375/316, 206, 375/349; 370/441, 445

[56] References Cited

U.S. PATENT DOCUMENTS

| | | | |
|---|---|---|---|
| 3,723,877 | 3/1973 | Miller | 325/30 |
| 5,131,011 | 7/1992 | Bergmans et al. | 375/101 |
| 5,285,480 | 2/1994 | Chennakeshu et al. | 375/101 |
| 5,499,236 | 3/1996 | Giallorenzi et al. | 370/18 |
| 5,512,908 | 4/1996 | Herrick | 342/387 |
| 5,515,378 | 5/1996 | Roy, III et al. | 370/95.1 |
| 5,581,260 | 12/1996 | Newman | 342/374 |
| 5,583,853 | 12/1996 | Giallorenzi et al. | 370/441 |
| 5,619,492 | 4/1997 | Press et al. | 370/441 |
| 5,684,491 | 11/1997 | Newman et al. | 342/374 |

FOREIGN PATENT DOCUMENTS

| | | | |
|---|---|---|---|
| 0 564 849 | 10/1993 | European Pat. Off. | H04L 25/03 |
| 2 268 377 | 1/1994 | United Kingdom | H04L 25/03 |
| WO 93/19519 | 9/1993 | WIPO | H03D 1/04 |
| WO 94/24798 | 10/1994 | WIPO | H04L 25/30 |
| WO 95/14336 | 5/1995 | WIPO | H04B 7/26 |

OTHER PUBLICATIONS

Kohonen et al., "Start–Up Behaviour of A Neural Assisted Decision Feedback Equaliser In A Two–Path Channel", IEEE Jun. 1992, pp. 1523–1527.

Varanasi et al., "Multistage Detection in Asynchronous Code–Division Multiple–Access Communications", IEEE, Apr. 1990, pp. 509–519.

Cooper, G. et al., "Detection of Spread–Spectrum Signals", *Modern Communication and Spread Spectrum*, 1986, pp. 345–375.

Lupas et al., "Near–Far Resistance of Multiuser Detectors in Asynchronous Channels", *IEEE Transactions on Communications*, Apr. 1990, pp. 496–508.

Lupas et al., "Linear Multiuser Detectors for Synchronous Code–Division Multiple–Access Channels", *IEEE Transactions on Communications*, Jan. 1989, pp. 123–136.

(List continued on next page.)

*Primary Examiner*—Stephen Chin
*Assistant Examiner*—Mohammad Ghayour
*Attorney, Agent, or Firm*—Pillsbury Madison & Sutro

[57] ABSTRACT

In a receiving method for multiple access and a receiver for use in a telecommunication system, a number of signal components in a received signal and channel parameters are detected simultaneously by the use of a receiver that is approximately optimal. An adaptive signal dot matrix is controlled by means of an associative network with recursive processing of the received signal in a detector. The detection algorithm aims at simulating distortions on the channel and provides an adaptation to the current interference situation even if the origin of interference is unknown. This provides a receiver that is more resistant to interference over the radio path. A received signal is divided in the time domain into blocks of a certain length, the blocks being used for simultaneous estimation of user data and channel parameters by recursive processing of each block. A quick adaptation of the receiver to the transmission propagation conditions is thus obtained.

15 Claims, 3 Drawing Sheets

OTHER PUBLICATIONS

Kohonen, Teuvo, "Self–Organizing Feature Maps" "Pattern Recognition", *Self–Organization and Associative Memory*, 1989, pp. 119–157 and 185–209.

Kohonen, Teuvo, "Things You Haven't Heard about the Self–Organizing Map", *IEEE*, 1990, pp. 1147–1156.

Kohonen, Teuvo, "Generalizations of the Self–Organizing Map", *Proceedings of 1993 International Joing Conference on Neural Networks*, 1993, pp. 457–462.

Kohonen, Teuvo, "The Self–Organizing Map", *Proceedings of The IEEE*, 1990, pp. 1464–1480.

Kechriotis et al., "Implementing the Optimal CDMA Multiuser Detector with Hopfield Neural Networks", *Applications of Neural Networks to Telecommunications* (ed. Alspehtor et al.), 1993, pp. 60–66.

Kechriotis et al., "Hopfield Neural Network Implementation of the Optimal CDMA Multiuser Detector", *IEEE Transactions on Neural Networks*, Jan. 1996, pp. 1–11 (and "Figure Captions", pp. 1–13).

Hecht–Nielsen, "Associative Networks: Data TRansformation Structures" and "Mapping Networks: Multi–Layer Data Transformation Structures", *Neurocomputing*, 1989, pp. 79–163.

Aazhang et al., "Neural Networks for Multiuser Detection in Code–Division Multiple–Access Communications", *IEEE Transactions on Communications*, Jul. 1992, pp. 1212–1222.

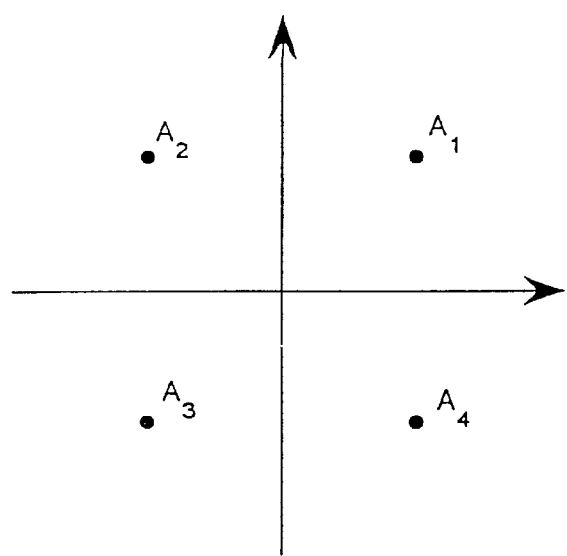
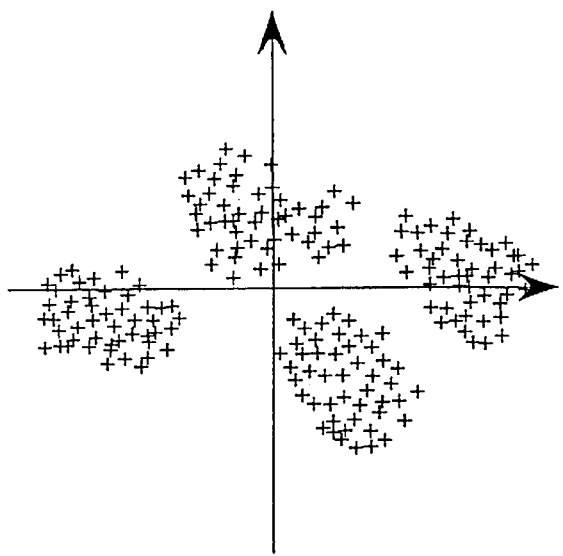
FIG. 1a                    FIG. 1b
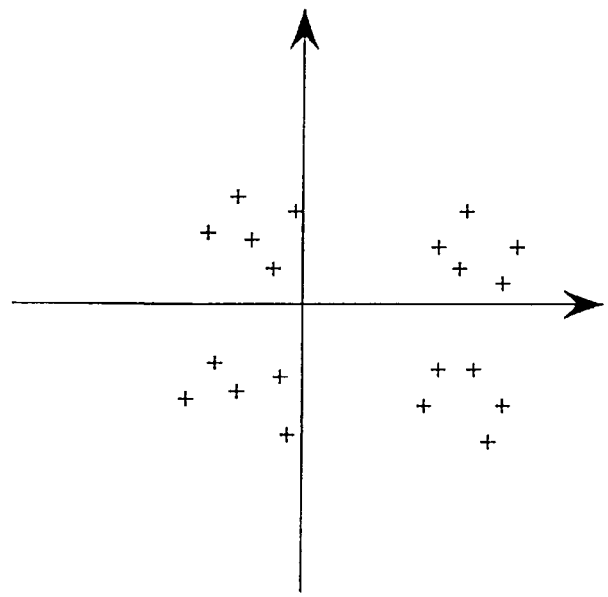
FIG. 2

RECEIVING METHOD AND RECEIVER

This application is the national phase of international application PCT/ FI95/00217 filed Apr. 13, 1995 which designated the U.S.

BACKGROUND OF THE INVENTION

The invention relates to a receiving method for use in a telecommunication system in which a number of signal components are detected simultaneously from a received signal.

One central problem in the design and implementation of telecommunication systems is simultaneous transmission of signals to and reception of signals from several simultaneous users such that interference between the signals is minimal. Because of this problem and the transmission capacity used, various transmission protocols and multiple access methods have been developed, the most common in mobile phone communication being FDMA and TDMA methods, and recently the CDMA method also.

CDMA is a multiple access method based on a spread spectrum technique, and it has recently been put into use in cellular radio systems in addition to previously used FDMA and TDMA. CDMA has many advantages over the prior methods, such as simplicity of frequency planning, and spectrum efficiency.

In the CDMA method, a narrow-band data signal of a user is multiplied to a relatively broad band by a spreading code having a much broader band than the data signal. Band widths used in known test systems include, e.g., 1.25 MHz, 10 MHz and 25 MHz. During the multiplication, the data signal spreads over the entire band to be used. All the users transmit simultaneously on the same frequency band. On each connection between a base station and a mobile station, a different spreading code is used, and the signals of the users can be distinguished from one another in the receivers on the basis of the user's spreading code. If possible, the spreading codes are selected in such a way that they are mutually orthogonal, i.e. they do not correlate with one another.

Correlators in conventionally implemented CDMA receivers are synchronized with a desired signal, which they recognize on the basis of the spreading code. In the receiver, the data signal is restored to the original band by multiplying it by the same spreading code as in the transmission step. Ideally, the signals that have been multiplied by some other spreading code do not correlate and are not restored to the narrow band. In view of the desired signal, they thus appear as noise. The object is thus to detect the signal of the desired user from among a number of interfering signals. In practice, the spreading codes partially correlate, and the signals of the other users make it more difficult to detect the desired signal since they distort the received signal non-linearly. This interference caused by the users to one another is called multiple access interference.

In a telecommunication system applying the TDMA multiple access method, there are several frequencies in use, each frequency being divided into time slots, in which the signals of different users are inserted. Each user thus has a time slot of their own. Since the frequency range reserved for the system is usually limited, the frequencies used must usually be repeated in cells located within a certain distance. For high frequency efficiency, the distance must be kept as short as possible. As a result, different transmissions at the same frequencies interfere with one another. In a certain time slot, a noise signal is thus also heard in the receiver in addition to the desired signal, the noise signal coming from some other connection using the same frequency.

The single-user detection method described above in connection with CDMA is not optimal, since the information contained in the signals of the other users is not taken into account in the detection. In addition, non-linearities caused by partly non-orthogonal spreading codes and distortion of the signal over the radio path cannot be corrected by a conventional detection method. In an optimal receiver, all information contained in the signals of the users is taken into account so that the signals can be optimally detected using, e.g., a Viterbi algorithm. The advantage of this detection method, e.g. in a CDMA system is that the bit error ratio curves of the receiver are similar to a situation in a single-user CDMA system where no multiple access interference occurs. For example, a near-far problem, which is typical of CDMA systems, does not arise. A near-far problem is a situation where the transmission from a transmitter close to the receiver blankets the more distant transmitters. The major drawback of the Viterbi algorithm is that the computing efficiency that it requires increases exponentially with the number of users. For example, with QPSK modulation, a ten-user system with a bit rate of 100 kbit/s would require 105 million operations per second for computing a probability function. In practice, this makes it impossible to implement an optimal receiver.

An optimal receiver, however, can be approximated by different methods. Prior art teaches various methods for simultaneous multiuser detection (MUD). The best known methods of this kind are linear multiuser detection, a decorrelating detector and a multistage detector. These methods are described in greater detail in Varanasi, Aazhang, 'Multistage detection for asynchronous code division multiple access communications,' *IEEE Transactions on Communications, Vol.* 38, pp. 509–519, April 1990; Lupas, Verdu, 'Linear multiuser detectors for synchronous code-division multiple access channels,' *IEEE Transactions on Information Theory, Vol.* 35, No. 1, pp. 123–136, January 1989; and Lupas, Verdu, 'Near-far resistance of multiuser detectors in asynchronous channels,' *IEEE Transactions on Communications, Vol.* 38, April 1990. The disadvantage of all these methods, however, is that they do not track changes on the radio channel.

In the detection of a multiuser signal, it is previously known to use an adaptive signal dot matrix which tracks changes on the channel. The method is described in international patent application PCT/FI94/00503, which is incorporated herein by reference. The disadvantage of the method, however, is that as the number of simultaneous users increases, the computing capacity needed increases exponentially.

Further, international patent application PCT/US93/01154 teaches recursive estimation of changes on a radio channel, but the method is restricted to computation of weighting coefficients of the signals, which are useful in the detection of a single-user signal.

SUMMARY OF THE INVENTION

The present invention provides a new way of approximating an optimal receiver. The method is more resistant to interference over the radio path. Conventional multiuser detection algorithms are specific to the channel model on the basis of which they have been designed. A theoretical channel model is not relevant to the method of the invention, since the algorithm as such aims at simulating distortions on the channel. The method adapts to the current situation even if the origin of the interference is unknown. For example, a signal received in CDMA may comprise transmissions whose spreading codes are not known to the receiver. These may include, for example, transmissions from a neighboring cell. The same situation arises in the TDMA method. Further, the method adapts more quickly and requires much less computing capacity than the earlier neural network applications.

The method is characterized in that the received signal is divided in the time domain into blocks of a certain length, and that the blocks are subjected to simultaneous estimation of user data and channel parameters in the receiver by recursive processing of each block.

The invention also relates to a receiver comprising an antenna, radio frequency parts, an A/D converter and means for processing a received signal. The receiver of the invention is characterized by comprising means for dividing the received signal in the time domain into blocks of a certain length, the dividing means being operatively connected to the means for processing the received signal; means for setting the initial values for estimation, the setting means being operatively connected to the means for dividing the received signal into blocks; first switching means operatively connected to the means for setting the initial values for estimation and to means for updating the estimation parameters; means for simultaneous estimation of user data and channel parameters, the estimation means being operatively connected to the first switching means; second switching means, which are operatively connected to the estimation means and the output of which yields an estimate for the received signal; and means for updating the estimation parameters, the input of the updating means being operatively connected to the second switching means and the output to the first switching means.

The method of the invention makes it possible to approximate an optimal receiver with a desired accuracy. The receiver of the method adapts quickly and accurately to the propagation conditions on the radio path that change at random with time and distort the received signal. The advantage of the method is its linear complexity in relation to the number of simultaneous users. The advantages of the method thus become more apparent when the number of users is large.

In one preferred embodiment of the invention, simultaneous detection of a signal and channel parameters is implemented by the use of an adaptive signal dot matrix, which is controlled by means of an adaptive associative network, with recursive processing of the received signal.

In another embodiment of the invention, a weighting coefficient is also computed in connection with the detection, the coefficient being used for assigning user data to a correct signal dot matrix group. The weighting coefficient can also be used in recursive detection of data and in its later processing.

BRIEF DESCRIPTION OF THE DRAWINGS

In the following the invention will be described in greater detail with reference to the examples illustrated in the attached drawings, in which:

FIGS. 1a and 1b illustrate the configuration of a received signal at the output of matched filters, FIG. 2 illustrates an example for dots indicated by codebook vectors.

DETAILED DESCRIPTION

Figure 3:
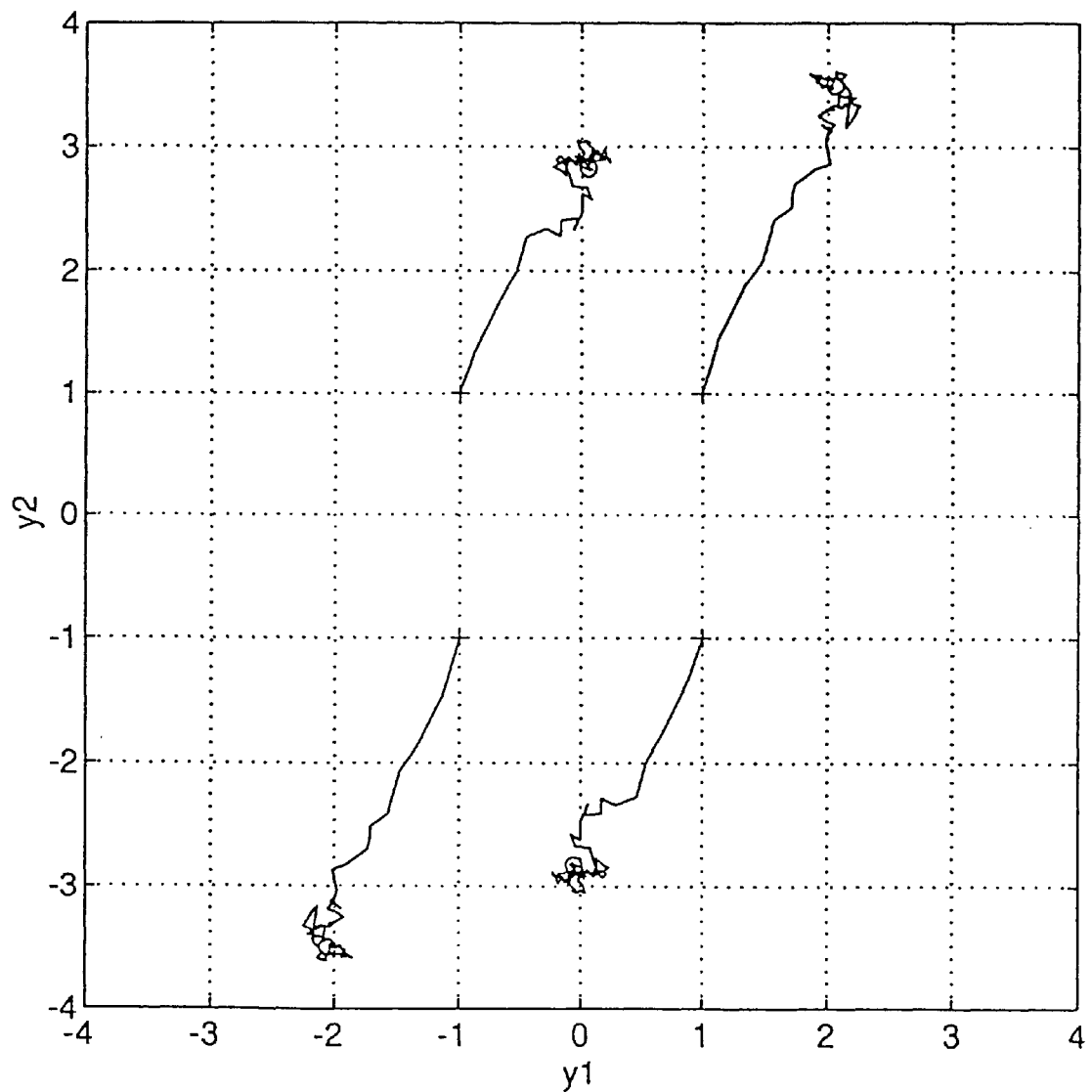
FIG. 3 illustrates movement of a signal dot matrix when a receiver is processing a signal received recursively.

In the following, the method of the invention will be described with reference to a telecommunication system in which the CDMA multiple access method is applied. The method, however, is also suited for use in systems using other multiple access methods.

In digital telecommunication, modulating signals are given only discrete values, such as $\pm A_c$, $\pm 3 A_c$, at the sampling moment. In a receiver, the discrete values must thus be identified from an often distorted signal that has passed over the radio path. FIG. 1 illustrates an ideal double-user signal pattern, i.e. a dot density function of the received signals, the peaks of the function being found at crosspoints. Each dot in the two-dimensional pattern stands for one possible value of a received signal, the value depending on the values of the signals transmitted by the users. Dot A1, for example, could stand for (1,1), in which the first user has transmitted 1, and the second user has transmitted 1. Correspondingly, dot A2 could stand for (−1,1), in which the first user has transmitted −1, and the second user has transmitted 1. Dot A3 could then stand for (−1,−1), and dot A4 for (1,−1). If there were three users, the pattern would be three-dimensional; and as the number of users increases, the dimension of the pattern increases accordingly.

FIG. 2 illustrates distortion of the signal pattern at the output of the filters matched to spreading codes in the receiver, the distortion being caused by non-orthogonal codes or taking place over the radio path. The peaks of the dot density function have widened, and shifted because of the distortion. The dots for the received signals have shifted from their ideal positions, and the function of the receiver is to interpret the received signals as being assigned to a predetermined signal dot.

If decisions were made totally linearly, there would be many incorrect decisions because of the distorted dot matrix, as shown in FIG. 2. By the method of the invention, it is possible to implement piecewise linear decision boundaries, by which it is possible to approximate optimal non-linear detection with a desired accuracy.

Let the system have K users, i.e. CDMA transmitters, each of which has its own individual spreading code $S_k$, k=1,2. . . K, which is non-zero in the interval [0,T], where T stands for the duration of the symbol. All the users transmit in the same frequency band, and each modulates the data bit $b_k^{(i)}$ by its own spreading code. The function of the receiver is then to demodulate the signal, which, e.g. in the BPSK modulation method is defined by $$r(t) = \sum_i \sum_{k=1}^{K} \sqrt{w_k}\, b_k^{(i)} S_k(t-iT) + n(t),\ t \in R,$$

where n(t) is a noise term, $b_k^{(i)} \in \{-1,1\}$ stands for the information bit of the kth user in the ith time slot, and $w_k$ stands for the energy of the received signal of the kth user.

In multiuser detection, decisions about the received signals are made simultaneously for all the K users. Let the channel in this example be a Gaussian channel, and let the bits transmitted by all the K users simultaneously at a certain moment be defined by the vector $b \in \{-1,1\}^K$. The maximum likelihood decision made in the receiver is known to be based on a logarithmic probability function $$b_{opt} = \arg_{b \in \{-1,1\}^K} \max \{2y^T b - b^T H b\}$$

where the channel matrix H=RW, in which R is a cross-correlation matrix between the used spreading codes, i.e. $(R)_{ij} = \langle S_i, S_j \rangle$, i,j=1,2, . . . ,K, and W is a diagonal matrix of the user energies, i.e. W=diag $(w_1, \ldots, w_k)$ The vector $y=(y_1, \ldots, y_k)^T$ consists of the matched filter outputs of the receiver. The above equation can be solved with a Viterbi-type algorithm, but the complexity of the computation makes it impossible to implement an optimal receiver of this kind in practice, as stated above.

In the receiving method of the invention, multiuser data and channel parameters are thus detected simultaneously using a recursive detector. The channel parameters here comprise all channel information needed for making a decision concerning data detection, such as the power, phase and delay of each received signal, and correlation between the different signal components.

In a preferred embodiment of the invention, detection is based on a detection method based on an adaptive multidimensional signal dot matrix. After the RF parts and A/D conversion, the received signal is supplied to signal preprocessing means, which in CDMA may be, e.g., matched filters. The signal is then divided in the time domain into blocks of a certain length, which are then processed recursively in the receiver. In recursive detection, the same signal block is processed a desired number of times. From each signal block, i.e. signal received within a certain time slot, the user data and channel parameters are detected by common estimation. The signal blocks are not necessarily totally separate in the time domain but, if necessary, overlap in part. Samples can be picked from each block in a desired order and a desired number of times. The samples are processed either one at a time or blockwise. In common estimation, the contents of each block are used at least once. The channel parameters and data of a specified period of time are estimated on the basis of the signal received in that particular period of time.

In the detection, the signal received from the signal preprocessing means, which can be expressed as vector y, is assigned to a signal dot matrix group to which the nearest codebook vector, e.g. $m_i$, belongs. For finding the closest codebook vector, a distance function $d(y, m_i)$ is used, the function corresponding to the criterion used in the detection. The closest codebook vector is thus obtained by the distance function, using the formula $$c = \arg_i \min \{d(y, m_i)\}.$$

An often used computation method for determining the distance to the closest codebook vector is to compute the Euclidean distance by the formula $$c = \arg_i \min \{\|y - m_i\|\}.$$

The distance functions determined by the two equations above—both the optimal and the Euclidean distance function—lead to exponential complexity as the number of users increases. This results in a heavy computational load in the receiver.

In a preferred embodiment of the invention, a signal is classified using an associative network, because of which the complexity increases linearly and the computational load in the receiver is significantly reduced. The theory of an associative network is described in greater detail in Hecht-Nielsen: *Neurocomputing*, Addison-Wesley, New York, 1989, chapters 4 and 5. Detection based on the description of the associative network is either linear or non-linear.

An example for non-linear detection is the Hopfield neural network, which is described in Kechriotis, Manolakos: 'Implementing the Optimal CDMA Multiuser Detector with Hopfield Neural Network', *Proceedings of the International Workshop of Applications of Neural Networks to Telecommunications*, Lawrence Erlbaum Associates, Publishers 1993, ed. J. Alspehtor, R. Goodman, T. Brown, and in *Varanasi, Aazhang* mentioned above. The use of an associative network makes it possible to reduce the number of computations both in channel estimation and in data detection, and the associative network can be implemented with a desired complexity, depending on the channel and the desired number of computations. The energy function of the Hopfield complex heteroassociative network in BPSK is $$E = 2Re(y^{(i)T} Wb) - b^T WRWb,$$

which can also be expressed as $$E = 2b^T T - b^T Cb,$$

where $$C = WRW,$$

and $$T = W\hat{y}^{(i)}.$$

Channel matrices C(i) and T are typically different for each symbol since channel parameter matrix W varies with time. The associative network must thus also be adaptive.

Assume that the bit estimates are produced by the associative network and that the channel parameters vary with time. The channel parameters can be learned by associative mapping. The associative mapping must learn mapping y=Hb, given sample pairs $(y^{(i)}, \sim b^{(i)})$. The learning may be implemented by using estimated symbols according to $$\hat{H}^{(i+1)} = \hat{H}^{(i)} + \alpha_i (y^{(i)} - \hat{H}^{(i)} \hat{b}^{(i)}) \hat{b}^{(i)T},$$

if $y^{(i)}, \hat{b}^{(i)} \in \omega_n$ $$\hat{H}^{(i+1)} = \hat{H}^{(i)} - \alpha_i (y^{(i)} - \hat{H}^{(i)} \hat{b}^{(i)}) \hat{b}^{(i)T},$$

if $y^{(i)} \in \omega_n, \hat{b}^{(i)} \subset n\omega_m, n \neq m$ or $$\hat{H}^{(i+1)} = \hat{H}^{(i)} + \alpha_i (y^{(i)} - \hat{H}^{(i)} \hat{b}^{(i)}) \hat{b}^{(i)T} + \Sigma \hat{b}^{(i)} \in N_{\hat{b}^{(i)}} \beta_i (y^{(i)} - \hat{H}^{(i)} \hat{b}^{(i)}) \hat{b}^{(i)T}$$

Indices (i) and (i+1) above are thus iterative indices and not data indices. The same data can be run through the above formulae a plural number of times.

An example for linear detection is, e.g., decorrelating detection, in which an associative network can thus be used as a decision rule.

In a preferred embodiment of the invention, the associative network can be implemented by channel matrix H. The channel matrix and signal dot matrix are related to each other according to $$m_i = H b_i,$$

where $b_i$ denotes a bit vector of the user. In practice, this means that when codebook vector distances are computed, only linearly independent codebook vectors are taken into account.

In a recursive loop, the channel matrix is estimated more and more accurately in every round on the basis of the same signal block, which makes decision-making more accurate.

In a preferred embodiment of the invention, two alternative adaptive correction methods can be used: learning vector quantization LVQ and self-organizing map SOM.

When LVQ is used, an adaptive signal dot matrix is corrected by means of a training sequence contained in the received signal. The receiver is thus able to adapt to the distortion of the received signal by distorting the signal dot matrix accordingly. The method is described in greater detail in Teuvo Kohonen, *Self-Organization and Associative Memory*, Springer-Verlag, Berlin-Heidelberg-New York-Tokyo, 3rd ed., 1989.

When the receiver corrects the adaptive signal dot matrix by means of a self-organizing map SOM, a separate training sequence is not needed. Like LVQ, the SOM method has earlier been applied to pattern recognition problems, and it is described in greater detail both in the above reference and in Teuvo Kohonen, 'The Self-Organizing Map,' *Proceedings of the IEEE* 78(9), pp. 1464–1480, 1990; Kohonen, 'Generalizations of the Self-Organizing Map,' *Proc. of the International Joint Conference on Neural Networks IJCNN'93*, Nagoya, Japan, Oct. 25–29, 1993; Kohonen, 'Things You Haven't Heard about the Self-organizing Map,' *Proceedings of the 1993 IEEE Int. Conf. Neural Networks*, San Francisco, U.S.A., Mar. 28 to Apr. 1, 1993, pp. 1147–1156; and Kohonen, Raivio, Simula, Henriksson, 'Start-Up Behaviour of a Neural Network Assisted Decision Feedback Equalizer in a Two-Path Channel,' *Proc. of IEEE Int. Conf. on Communications*, Chicago, U.S.A., Jun. 14–18, 1992, pp. 1523–1527.

In the following, both the above methods are illustrated with respect to the method of the present invention.

An optimal multiuser CDMA receiver functions non-linearly in response to an exhaustive identifier obtained from the filters matched to the spreading codes. The LVQ and SOM methods can here be used for estimating optimal Bayesian decision boundaries. The Bayesian decision boundaries distinguish the classes with a minimum number of mistakes.

Every discrete signal space possible can be considered to form its own class $\omega_k$. Each class is defined by a group of codebook vectors whose dimension can be defined to vary with the application.

The number of codebook vectors per class depends on the desired accuracy of approximation. If each class comprises only one codebook vector, the decision boundaries are linear. The more codebook vectors there are, the more accurately decision making approximates an optimal receiver when the decision boundaries are piecewise linear and the complexity increases with the number of codebook vectors. Each class may also comprise a different number of code-book vectors. Each codebook vector points to a dot that represents the class. When a preliminary number of codebook vectors have been assigned to each class and stored in an associative network, the following LVQ algorithm can be used for estimating the true channel matrix H.

The information obtained from the output of the matched filters is supplied to an LVQ block, which iteratively updates the matrix in accordance with the following equations:

$$\hat{H}_{i+1} = \hat{H}_i + \alpha_i(y - \hat{H}_i \hat{b}_i)\hat{b}_i^T,$$

if $y, \hat{b}_i \in w_i$ $$\hat{H}_{i+1} = \hat{H}_i - \alpha_i(y - \hat{H}_i \hat{b}_i)\hat{b}_i^T,$$

if $y \in w_i$, $\hat{b}_i \in w_j$, i j where the individual learning rates are defined e.g. by $$\alpha_{i+1} = \frac{\alpha_i}{1 + s_i \alpha_i},$$

where $s_i$–1 stands for correct classification and –1 for incorrect classification. The selected decision algorithm gives the decisions $\hat{b}_i$.

A signal received by LVQ contains a known training sequence, on the basis of which the detector (either adaptive signal dot matrix or adaptive associative network) is updated.

In a method based on a self-organizing map, the learning process, i.e. correction of codebook vectors, differs from LVQ in that the received signal does not contain a special learning sequence but the self-organizing map assigns codebook vectors in an adaptive signal dot matrix directly on the basis of the received signal to where the number of the received signal dots is the largest. It thus automatically adapts to the received signal. In SOM, the matrix is updated, e.g. according to the following equation:

$$\hat{H}_{i+1} = \hat{H}_i + \alpha_i(y_i - \hat{H}_i \hat{b}_i)\hat{b}_i^T + \sum_{\tilde{b}_i \in N_{\hat{b}_i}} \beta_i(y_i - \hat{H}_i \tilde{b}_i)\tilde{b}_i^T$$

where $\hat{b}_i$ is the symbol estimate given by the selected decision algorithm, $\tilde{b}_i$ denotes an alternative rival bit sequence, and $N_{\hat{b}i}$ denotes a set of rival decisions. Rival decisions are a set of second best—but not best—matching—classifications of the received signal.

$\alpha_i$ and $\beta_i$ are convergent coefficients, by which the operation of the detector can be controlled. The coefficients can be selected such that the detector adapts to a stationary channel, or alternatively the detector tracks the non-stationary changes of the channel.

The implementation utilized in the above is that a weighting coefficient is also computed in connection with the detection, and the user data is assigned to the appropriate signal dot matrix on the basis thereof. The weighting coefficient can be utilized both in recursive detection and later processing of data. This method makes it possible to eliminate improbable decisions and thereby speed further computation.

A weighting coefficient for the accuracy of detection is determined by computing a function of the probability of the estimated class of the signal and, if necessary, the probabilities of the rival classifications. The probabilities can be estimated using an estimated channel matrix. The computed weighting coefficient can also be called a confidence coefficient.

The computed weighting coefficient can thus be used for both classifying the signal and updating the detector. Updating of an associative network or adaptive signal dot matrix can be based on both the signal classification conducted and the computed confidence coefficient relating thereto. In addition, it is possible to take into account in the updating procedure the ideal classification, and a set of second best classifications and their weighting coefficients.

The primary advantage of the above method, in which both the actual decision and a set of second best classifications are thus used, is that the receiver knows how reliable the decision is. When the computed weighting coefficients show that the decision is reliable, even major changes can be made in the receiver, whereas with unreliable decisions, changes are made gradually.

The method of the preferred embodiment of the invention can be illustrated by the following solution:

Step 1: Set the initial values in matrix $\hat{H}_0$.

Step 2: Read the matched filter output and divide it into blocks.

Step 3: Classify the signal of the block that is being processed by the detector routines described above.

Step 4: Update the associative network using e.g. the above formulae.

Step 5: If the block has been processed a desired number of times, change the block to be processed.

Step 6: Go to step 3.

In the following, the method of the invention is illustrated by a simple example. Let the system have two active users with spreading codes $S_1=[1,1,1]$ and $S_2=[1,-1,1]$, the cross-correlation of the codes being 1/3. The channel is assumed to be a Gaussian channel. In the receiver, the signal/noise ratio of the first user is 8 dB and that of the second user is 10 dB. The matrix W thus has the value W=diag(1,3.16). The initial value of the matrix $\hat{H}_0$ in a detector using a self-organizing map is set to be the identity matrix I.

FIG. 3 illustrates shifting of a signal dot matrix as the receiver recursively processes a received signal. At the starting point, the dots of the identity matrix were set as the initial value, but now the dot matrix has shifted towards the actual signal distorted by the channel.

In a preferred embodiment of the invention, an associative network can be implemented by a cross-correlation matrix R. As described above, the channel matrix H is defined by the product H=RW, where R is the cross-correlation matrix of the spreading codes used, i.e. $(R)_{ij}=<S_i,S_j>$, i,j=1,2, ... ,K and W is the diagonal matrix of the user energies, W=diag $(w_1, \ldots, w_k)$.

When only a cross-correlation matrix is used, no energy matrix W is needed in the computation, and this makes computing faster as compared with the use of a channel matrix.

Figure 4:
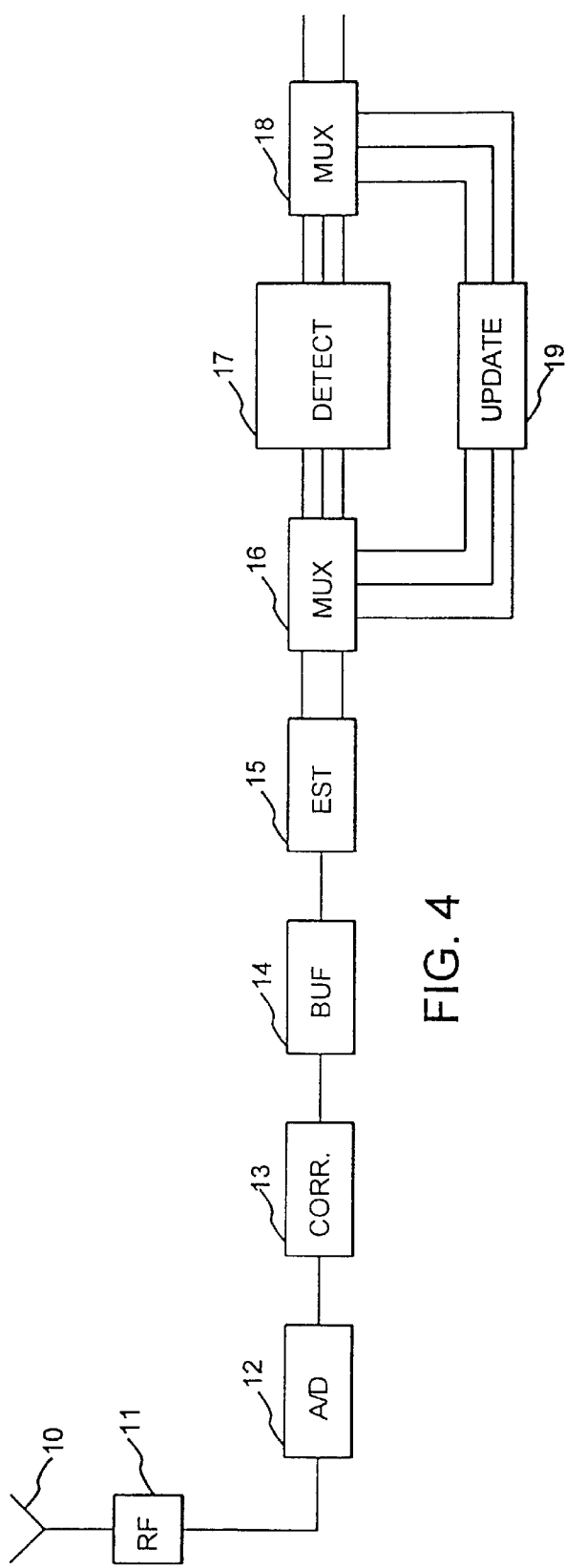
FIG. 4 is a block diagram illustrating an example for the structure of a receiver of the invention.

FIG. 4 shows the structure of a receiver according to the invention, in this example a base station receiver. The invention, however, can also be used in a mobile station in a similar way. The receiver comprises an antenna 10, which supplies the received signal through radio frequency parts 11 to an A/D converter 12. The converted signal is supplied to means 13, which preprocess the received signal. In a preferred embodiment of the invention, the means may be matched filters implemented, e.g. with a plural number of RAKE receivers, each of which receives signalling from one user. Each RAKE receiver comprises several separate correlators that are able to receive one multipath-propagated signal component. The received signal components are preferably combined in the RAKE receiver. The structure of the RAKE receiver is described in greater detail in G. Cooper, C. McGillem: *Modern Communications and Spread Spectrum*, McGraw-Hill, New York, 1986, chapter 12.

The receiver of the present invention, however, can also be implemented without RAKE receivers. An alternative is, for example, to increase the dimension of the associative network or the signal dot matrix. For example, if the channel model of the users has 1 taps, the dimension of the signal dot matrix or associative network is increased to be 1-fold.

From the matched filters, the signal is supplied to means 14, which divide the received signal in the time domain into blocks of a desired length and store the blocks for the duration of the processing. Each signal block is recursively processed in the receiver a desired number of times, whereafter the next block is obtained from means 14 for processing. From the dividing means 14, the signal is first supplied to means 15, where the initial values for estimation are set. In other words, the desired initial values are set in an associative network, such as a channel matrix, for the first round of estimation.

The division into blocks is illustrated by the following example. Let the output of matched filters 13 comprise samples $z_1, \ldots, z_j, z_{j+1}, \ldots, z_{j+J}$. If the length of a block is e.g. j, the block can be formed such that the first block comprises samples $L_1=\{z_1, \ldots, z_j\}$ and the second block samples $L_2=\{z_i, \ldots, z_{j+1+i}\}$, where i>1. If i=j+1, the blocks do not comprise any of the same samples, and do thus not overlap.

In means 15, the initial values for estimation are set by giving the blocks to the estimation algorithm a desired number of times, and by using the estimates obtained earlier as the initial values for the bits and channel parameters. If no earlier estimates are available, the parameters are estimated by some known method; in CDMA, for example, the parameters can be initialized by using the outputs of the RAKE branches. Alternatively, an ML method or a suboptimal ML method can be used.

From the setting means 15, the signal and the initial estimate of the associative network are supplied through a first switching means 16 to a detector means 17, where the data and channel parameters are detected simultaneously by an associative network using e.g. the above-described methods, such as LVQ and SOM. The output of the detector means thus gives the estimate for the signal and the channel parameters, and the instant values for the associative network. In one preferred embodiment, the probability of detection accuracy is also computed in the detector means 17, whereby this value may also be included in the output of the means 17.

The output of the detector means is supplied to second switching means 18, from whose output a signal estimate and the probability value for the estimate are obtained for further processing in the receiver. From switching means 18, the output of the detector means 17 is supplied further to estimation parameter updating means 19, where the associative network is updated on the basis of the results computed in the previous round.

The signal obtained from the updating means 19, which thus comprises updated parameters of the associative network, is supplied through the first switching means 16 back to the detector means 17, where the same data is re-detected by means of the updated associative network.

In the above-described recursive loop, each signal block is circulated a desired number of times, after which one starts to process the next signal block. In order that the processing might take place in real time, the detection process must naturally be faster than the data stream of the user to the receiver.

According to one embodiment of the invention, estimated channel parameters, such as received signal powers, which can be utilized, e.g. in power control, are also forwarded from the second switching means.

Figure 5:
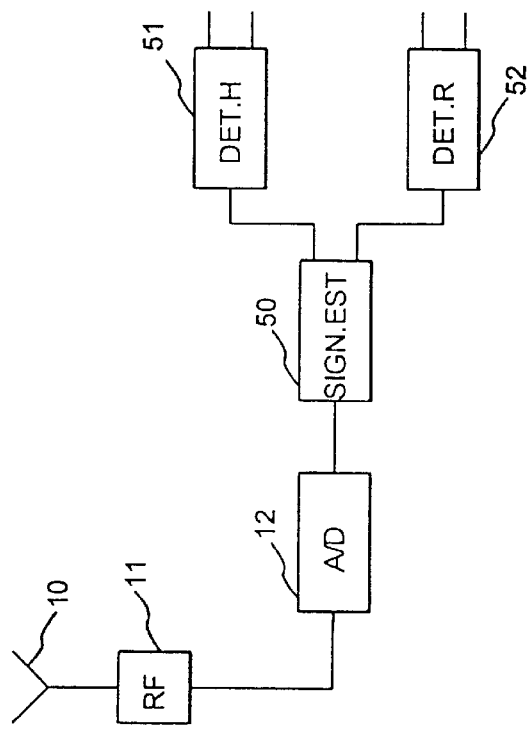
FIG. 5 illustrates another example for the structure of a receiver of the invention.

FIG. 5 is a block diagram showing another receiver of the invention. As above, the receiver comprises an antenna 10, RF parts 11 and an A/D converter 12. After this, the received signal is supplied to signal estimation means 50, which monitor the conversion rate of the received signal. The receiver comprises two estimation blocks 51, 52. In the first estimation block 51, the associative network is implemented using a channel matrix. In the second estimation block 52, the associative network is implemented using a cross-correlation matrix. The structure of the estimation block is similar to that of FIG. 4, comprising means 15 for initializing estimation, detector means 17, first and second switching means 16, 18, and estimation parameter updating means 19. The means 14 for dividing a signal into blocks can be arranged to be either common to both blocks, or within each block. In the figure, each block has its own means 14 for dividing the signal into blocks.

Means 50 thus monitor the conversion rate of the received signal, and if the conversion rate is high, a detector block is used which utilizes a cross-correlation matrix and is thus fast. If the conversion rate of the signal is low, a detector block utilizing a channel matrix is used.

Although the invention has been described above with reference to the example illustrated in the attached drawings, it is to be understood that the invention is not limited thereto but can be modified in many ways without deviating from the inventive idea claimed in the attached claims.

I claim:

1. A receiving method for use in a telecommunication system in which a number of signal components are detected simultaneously from a received signal received by a receiver, comprising:

dividing the received signal in the time domain into blocks of a certain length, subjecting the blocks to simultaneous estimation of user data and channel parameters in the receiver by recursive processing of each block, utilizing placing of dots on an adaptive signal dot matrix in the detection of signal blocks, computing the distance between each respective momentary signal sample of the received signal and vectors pointing to the dots on the signal dot matrix, and assigning each respective momentary signal sample to a respective certain dot on the signal dot matrix by selecting the respective dot where the distance between a respective codebook vector pointing thereto and the respective momentary signal sample is the shortest.

2. The method of claim 1, wherein:

at least some of said signal components are received from different users.

3. The method of claim 1, wherein:

practicing said utilizing, the dots on the adaptive signal dot matrix are placed in correct positions by using a training sequence contained in the received signal.

4. The method of claim 1, wherein:

in practicing said utilizing, the dots on the adaptive signal dot matrix are placed in correct positions on the basis of conducting a signal classification.

5. The method of claim 1, wherein:

said assigning includes classifying each said momentary signal sample by by using an adaptive associative network.

6. The method of claim 5, further comprising:

updating the adaptive associative network by using a training sequence contained in the received signal.

7. The method of claim 5, further comprising:

implementing the associative network by using a channel matrix.

8. The method of claim 1, further comprising:

computing respective weighting coefficients for respective detected symbols of the received signal, the coefficient indicating reliability of respective ones of the detected symbols.

9. The method of claim 1, wherein:

said utilizing includes placing the dots on the adaptive signal dot matrix in correct positions on the basis of an ideal classification, a number of second best classifications and weighting coefficients computed for said classifications.

10. The method of claim 5, further comprising:

updating the adaptive associative network on the basis of an ideal signal classification, a number of second best classifications and weighting coefficients computed for said classifications.

11. The method of claim 1, wherein:

said received signal contains said signal components as encoded by using a CDMA multiple access method in the telecommunication system.

12. A receivers, comprising:

an antenna;

radio frequency parts;

an A/D converter; and means for processing a received signal, means for dividing the received signal in the time domain into blocks of a certain length, said dividing means being operatively connected to said means for processing the received signal;

means for setting initial values for estimation, said setting means being operatively connected to said means for dividing the received signal into blocks;

means for updating estimation parameters;

first switching means operatively connected to said means for setting the initial values for estimation and to said means for updating the estimation parameters, said first switching means having an output;

detector means;

means for simultaneous estimation of user data and channel parameters, said means for simultaneous estimation being operatively connected to said first switching means, and to an adaptive signal dot matrix arranged for detection of signal blocks in the detector means, the detector means being responsive to the received signal, which is being processed, for correcting the signal dot matrix used in the detection;

second switching means, which are operatively connected to said estimation means and arranged to provide an output which yields an estimate for the received signal; and said means for updating the estimation parameters having an input which is operatively connected to said second switching means and having an output which is operatively connected to the first switching means.

13. The receiver of claim 12, wherein:

said means for simultaneous estimation of user data and channel parameters is arranged to provide such estimation by means of an adaptive associative network; and said detector means are responsive to the received signal, which is being processed, in updating said adaptive associative network.

14. The receiver of claim 12, wherein:

said estimation means includes means for computing a weighting coefficient for detected symbols of the received signal, the coefficient indicating reliability of respective ones of the detected symbols.

15. The receiver of claim 12, further comprising:

means for monitoring the conversion rate of the received signal, at least two different detector blocks for detecting the received signal, and means for selecting a detector block for detecting a received signal on the basis of the conversion rate of the received signal.

\* \* \* \* \*